No. 838,587. PATENTED DEC. 18, 1906.
H. A. E. C. VON SCHON,
SUBMERGED POWER STATION.
APPLICATION FILED MAR. 29, 1906.
2 SHEETS—SHEET 1.
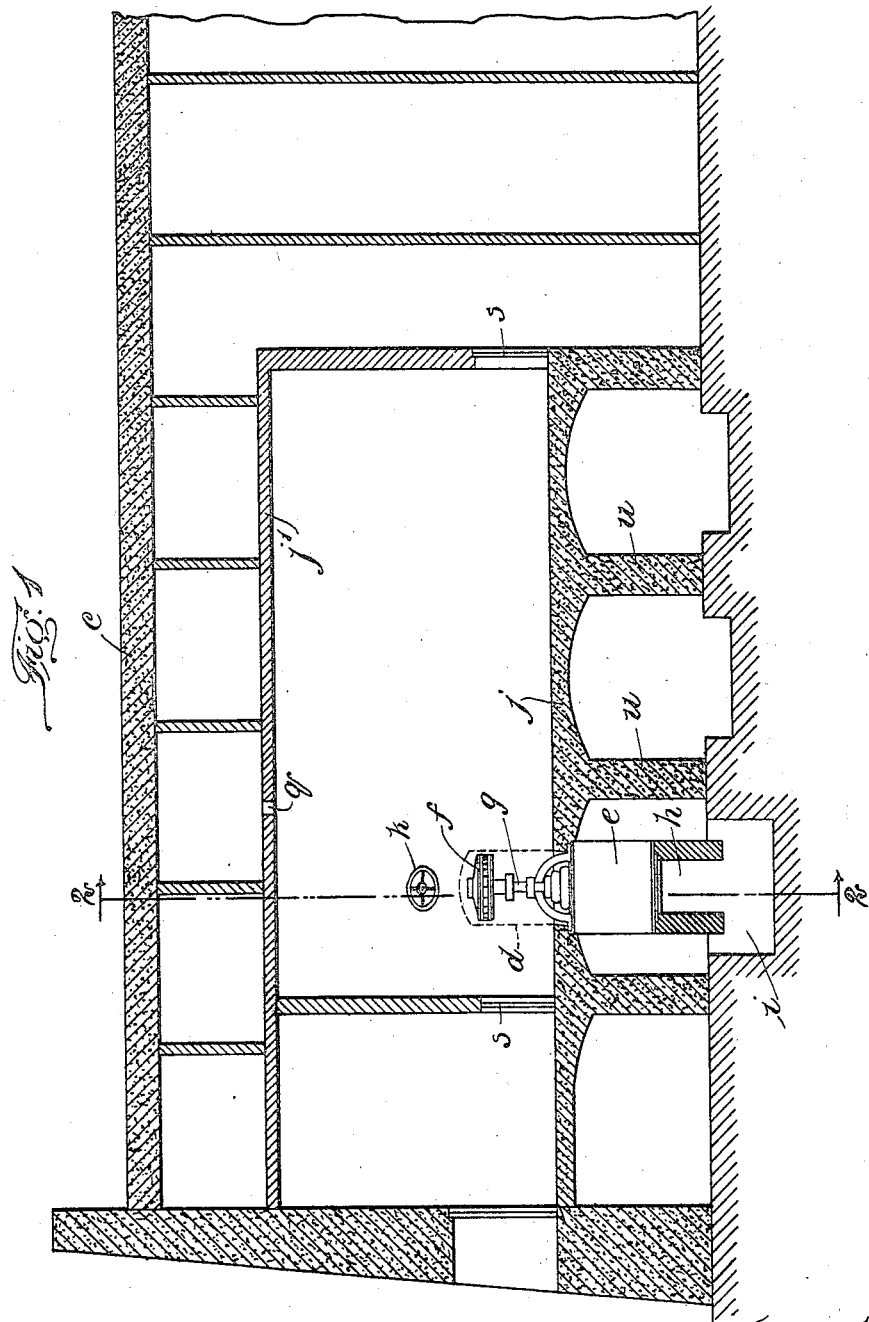

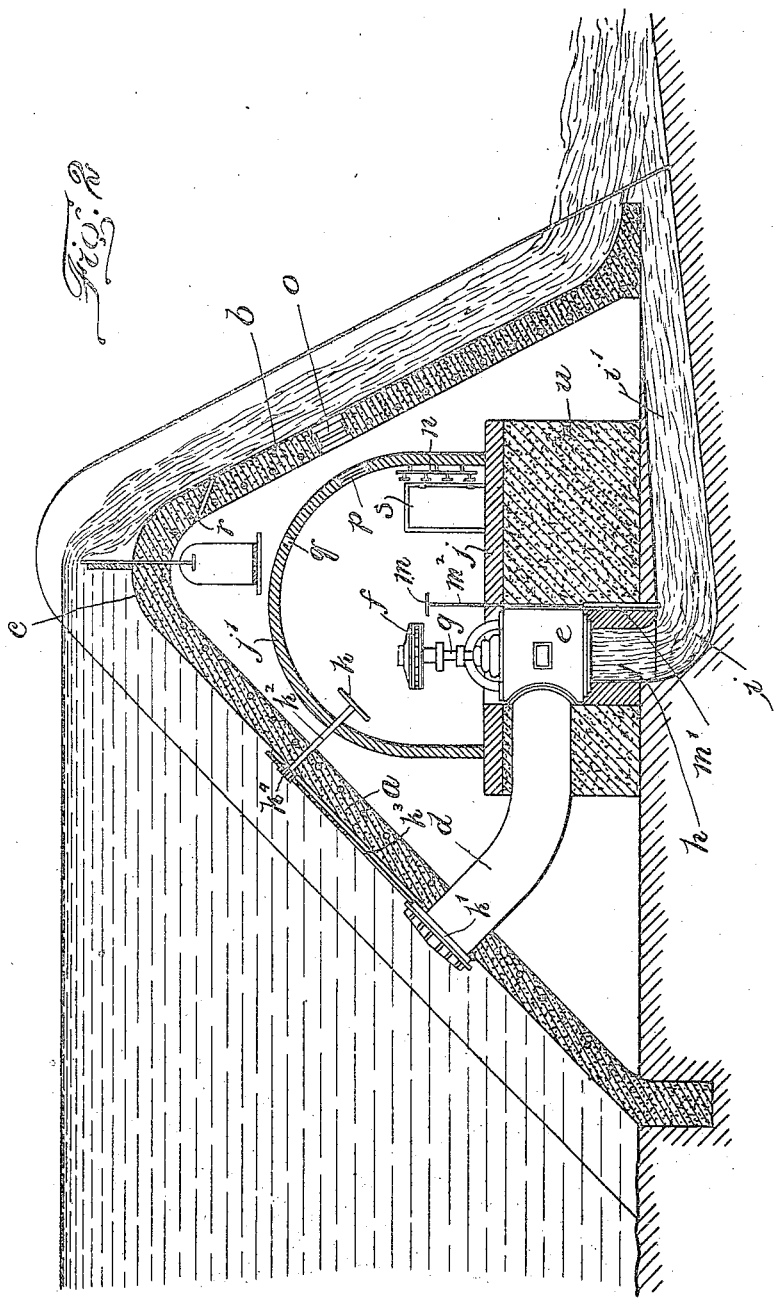

UNITED STATES PATENT OFFICE.

HANS AUGUST EVALD CONRAD VON SCHON, OF DETROIT, MICHIGAN.

SUBMERGED POWER-STATION.

No. 838,587. Specification of Letters Patent. Patented Dec. 18, 1906.

Application filed March 29, 1906. Serial No. 308,816.

*To all whom it may concern:*

Be it known that I, HANS AUGUST EVALD CONRAD VON SCHON, of Detroit, in the county of Wayne and State of Michigan, have invented certain new and useful Improvements in Submerged Power Stations or Plants, of which the following is a specification.

This invention has for its object to provide a power station or plant in the interior of a hollow or space-covering dam, and thereby utilize the space covered or protected by the dam.

The invention may be embodied in a hollow or space-covering dam of the concrete shell or other suitable type, having a turbine or its equivalent located in the space covered or protected by the dam, a feed-pipe adapted to conduct water under the desired head or pressure from the upstream side of the dam to the turbine, a draft-tube adapted to conduct water from the turbine, and a draft-tube well or depression located within said space and free from the disturbing influence of the water flowing over the dam, the said well being therefore constantly sealed by the escaping water, so that interference with the downdraft by the admission of water from the downstream side of the dam is prevented.

The invention may also be embodied in an inner structure constituting a power station or chamber adapted to contain machinery for developing and utilizing the power of falling water, said chamber being contained within the space covered or protected by the dam and having walls which are separated from those of the dam by air-spaces, so that the presence of moisture on the inner walls of the chamber shall be prevented or reduced to a negligible minimum. Provision is thus made for protection of the dynamo and other mechanism contained in the chamber against injurious action of moisture, which is liable to be present as the result of condensation or from other causes on the inner walls of the dam.

Of the accompanying drawings, forming a part of this specification, Figure 1 represents a view of my submerged power plant from the downstream side of a dam containing the same, portions being shown in side elevation and portions in longitudinal section. Fig. 2 represents a section on line 2 2 of Fig. 1.

The same reference characters indicate the same parts in both the figures.

The dam shown in the drawings for purposes of illustration is of reinforced concrete construction, and comprises a deck $a$, an apron $b$, and a crest $c$, connecting the deck and apron, although it is to be understood that any suitable dam structure may be used.

$d$ represents a feed-pipe having its intake in the deck $a$ and extending downwardly therefrom to a turbine-casing $e$, located within the space covered or protected by the dam.

$f$ represents a dynamo connected with the turbine-shaft $g$.

$h$ represents a draft-tube extending downwardly from the turbine-casing and discharging the tail-water into a well $i$, also located in said space and at the bottom portion thereof, said well discharging into a substantially horizontal flume $i'$, extending through the lower portion of the apron $b$ and discharging substantially at the level of the base of the apron. The relative arrangement of the draft-tube and flume is such that the level of the tail-water contained in the flume is always above the lower end of the draft-tube, so that the latter is sealed by the tail-water.

The flume $i'$ is covered by the dam structure, so that the tail-water therein is not agitated by the overflow water or overfall, and therefore constantly submerges the discharge end of the draft-tube, the latter being below the top of the flume. There is, therefore, no liability of the admission of air from the downstream side of the dam into the draft-tube to impair the force of the downdraft of water through said tube, the outlet or discharge end of the draft-tube being separated from the overfall by a part of the dam structure.

The space covered or protected by the dam contains a power-chamber, which, as here shown, comprises a floor $j$ and a superstructure $j'$, said chamber being adapted to contain the dynamo $f$ and suitable adjuncts, such as the operating member $k$ of a gate $k'$, controlling the feed-pipe $d$, the operating member $m$ of a gate $m'$, controlling the flume $i'$, and a switchboard $n$. The operating member $k$ is here shown as a handle affixed to a shaft $k^2$, having a gear $k^4$, meshing with a rack $k^3$, affixed to the gate, said shaft passing through the wall of the superstructure $j'$ and through the corresponding portion of the deck $a$. The operating member $m$ is connected by a rod $m^2$ with the gate $m'$, said rod passing through the floor $j$. Provision is thus made for the control of both gates from within the chamber.

The walls of the chamber are separated either wholly or throughout the greater part of their extent from the walls of the dam by air-spaces which provide for the evaporation and disposal of water of-condensation accumulating on the water-cooled inner surfaces of the dam and prevent such chilling of the walls of the chamber as to cause any injurious precipitation of moisture on the inner surfaces of the walls thereof.

Means are provided for supporting the power-chamber independently of the space-covering or protecting portions of the structure of the dam to the end that no injurious vibrations, due to the operation of the power-utilizing mechanism within the chamber, will be transmitted to the said portions of the dam structure. I therefor provide supports resting on the floor or foundation of the dam and supporting the floor $j$. The said supports may be piers $u\ u$, of reinforced concrete or other material. The floor $j$ is preferably of the same construction, while the superstructure $j'$ is preferably composed of hollow tiles.

Suitable provisions are made for lighting and ventilating the interior of the power-chamber. The lighting provisions, as here shown, comprise coinciding glazed openings $o\ p$, formed respectively in the apron of the dam and in an adjacent portion of the superstructure $j'$. Suitable ventilating-openings $g$ may be formed in the roof or in any other suitable part of the chamber. The type of dam here shown is provided with vent-passages $r$, extending through the upper portion of the apron for the purpose of breaking the partial vacuum behind the overfall and preventing trembling of the dam. The movement of the water across the apron induces an outward movement of air through the vent-passages, this movement insuring suitable ventilation through the ventilating-openings provided in the chamber. Suitable openings provided with doors 5 are provided, preferably at one or both of the end portions of the chamber, for ingress and egress and for the insertion and removal of machinery.

As already above indicated, the power-chamber is adapted to receive any machinery intended for the generating of hydraulic power and the utilization of the same by converting it into electric energy or otherwise. It is obvious that a steam-boiler may be installed in the power-chamber to generate steam and utilize the same to operate steam-engines and other machinery or for supplying live steam to melt away accumulations of ice on the dam-crest, flash-boards, sluice-gates, &c. Pumps may also be installed in the power-chamber to pump water by hydraulic, electric, or steam power into reservoirs or supply-mains.

I claim—

1. A power-chamber located within the space covered or protected by a dam, and having walls which are independent of the dam structure.

2. A power-chamber located within the space covered or protected by a dam, the walls of said chamber being separated from the walls of the dam by an air-circulating space.

3. A power-chamber located within the space covered or protected by a dam, and having supports which are independent of the dam structure, to prevent the transmission of injurious vibrations from the power-chamber to the dam.

4. A power-chamber located within the space covered or protected by a dam, and separated from the walls of the dam by an air-space, the chamber and dam having coinciding light-apertures.

5. A power-chamber located within the space covered or protected by a dam, and separated from the walls of the dam by an air-space, the chamber having one or more ventilating-openings communicating with said space.

6. A power-chamber located within the space covered or protected by a dam, and separated from the walls of the dam by an air-space, the said chamber having one or more openings for ingress and egress, and means for closing said opening or openings.

7. A power-chamber located within the space covered or protected by a dam, the latter having a feed pipe or conduit, with an intake at the upstream side of the dam, the said power-chamber being separated from the walls of the dam, and containing means for utilizing the power of water falling through the conduit.

8. A power-chamber located within the space covered or protected by a dam, the latter having a feed pipe or conduit, with an intake at the upstream side of the dam, said power-chamber being separated from the walls of the dam, and containing means for utilizing the power of water falling through the conduit, and means for controlling the flow of water through the conduit.

9. A submerged power plant located within a space covered or protected by a dam, and comprising a feed-pipe extending from the deck of the dam to a wheel-casing, a water-sealed draft-tube extending downwardly from the wheel-casing, the outlet of the draft-tube being within said space, and means for confining an accumulation of tail-water in said space in position to seal the delivering end of the draft-tube.

10. A submerged power plant located within a space covered or protected by a dam, and comprising a feed-pipe extending from the deck of the dam to a wheel-casing, a water-sealed draft-tube extending downwardly from the said casing, and having an outlet within said space, and a flume extending from the outlet of the draft-tube to the downstream side of the dam, said flume holding an accumulation of tail-water in position to seal the delivering end of the draft-tube.

11. A submerged power plant located within a space covered or protected by a dam, and comprising a feed-pipe extending from the deck of the dam to a wheel-casing, a draft-tube extending downwardly from the said casing, and having an outlet within said space, and a power-chamber located within said space.

12. A submerged power plant located within a space covered or protected by a dam, and comprising a feed-pipe extending from the deck of the dam to a wheel-casing, a draft-tube extending downwardly from the said casing, and having an outlet within said space, a power-chamber located within said space, and power-utilizing means and suitable adjuncts thereof located in said chamber.

In testimony whereof I have affixed my signature in presence of two witnesses.

HANS AUGUST EVALD CONRAD VON SCHON.

Witnesses:
WESLEY L. NUTTEN,
JOSEPH H. GODDARD.